United States Patent [19]
Thomas et al.

[11] Patent Number: 6,007,141
[45] Date of Patent: Dec. 28, 1999

[54] FUEL DOOR INTERLOCK FOR VEHICLE SLIDING DOOR

[75] Inventors: Bob Thomas, Harrison Township; Houng Yue Chang, Canton, both of Mich.

[73] Assignee: General Motors Corporation, Detroit, Mich.

[21] Appl. No.: 08/661,124

[22] Filed: Jun. 10, 1996

[51] Int. Cl.⁶ .............................. B62D 25/00; B60J 5/06
[52] U.S. Cl. ............... 296/155; 296/97.22; 292/DIG. 46
[58] Field of Search ................................. 296/155, 97.22; 292/DIG. 46; 180/286

[56] References Cited

U.S. PATENT DOCUMENTS

| | | | |
|---|---|---|---|
| 4,620,744 | 11/1986 | Yui et al. | 296/155 |
| 5,454,618 | 10/1995 | Sullivan | 296/155 X |
| 5,538,312 | 7/1996 | Lehmkuhl | 296/155 X |

Primary Examiner—Joseph D. Pape
Attorney, Agent, or Firm—Charles E. Leahy

[57] ABSTRACT

A blocker member is mounted on the vehicle body adjacent the floor mounted door track and includes a housing and a blocker lever which is pivotally mounted on the housing. The blocker lever is operably connected to the fuel filler door by a cable. When the fuel filler door is opened, the cable is tensioned and pivots the blocker lever to an extended position in which the blocker lever extends into the path of sliding movement the door. Thus, whenever the fuel filler door is open, the sliding door is blocked from sliding open into engagement with the fuel filler door. The blocker member preferably includes a resilient bumper against which the blocker lever seats in order to absorb energy when the door is slid into engagement with the blocker lever. The cable is preferably connected to the blocker by an actuator lever and spring arrangement by which the cable and actuator lever have a range of movement beyond the movement of the blocker lever so as to accommodate any misadjustment of the cable connecting the fuel filler and the blocker member.

7 Claims, 6 Drawing Sheets

FUEL DOOR INTERLOCK FOR VEHICLE SLIDING DOOR

The invention relates to a vehicle sliding door which, when opened, obstructs a fuel filler door, and more particularly provides an interlock mechanism which will limit movement of the sliding door to the open position whenever the fuel filler door is open.

BACKGROUND OF THE INVENTION

It is well known in van type vehicles to provide a sliding door mounted on tracks by which the door slides rearwardly to permit access to the vehicle passenger compartment.

It is also well known that typically, fuel a fuel filler door on the side wall of a vehicle conceals a fuel filler cap.

When the sliding door is open, the fuel filler door is inaccessible. However, when the vehicle sliding door is closed, the fuel filler door may be opened to access the fuel filler cap.

A disadvantage of the aforedescribed system is that an inadvertent attempted opening of the sliding door when the fuel filler door has already been opened will cause the sliding door to interfere with the fuel filler door.

SUMMARY OF THE INVENTION

According to the present invention, a blocker member is mounted on the vehicle body adjacent the floor mounted door track and includes a housing and a blocker lever which is pivotally mounted on the housing. The blocker lever is operably connected to the fuel filler door by a cable. When the fuel filler door is opened, the cable is tensioned and pivots the blocker lever to an extended position in which the blocker lever extends into the path of sliding movement the door. Thus, whenever the fuel filler door is open, the sliding door is blocked from sliding open into engagement with the fuel filler door.

The blocker member preferably includes a resilient bumper against which the blocker lever seats in order to absorb energy when the door is slid into engagement with the blocker lever. The cable is preferably connected to the blocker by an actuator lever and spring arrangement by which the cable and actuator lever have a range of movement beyond the movement of the blocker lever so as to accommodate any misadjustment of the cable connecting the fuel filler door and the blocker member. In addition, the actuator lever and spring form a one-way connection by which the door can depress the blocker lever to allow closing movement in the event that the fuel filler door and sliding door are both open.

BRIEF DESCRIPTION OF THE DRAWINGS

These and other objects, advantages and features of the invention will become apparent upon consideration of the description of the preferred embodiment and the appended drawings in which.

DESCRIPTION OF THE PREFERRED EMBODIMENT

Figure 1:
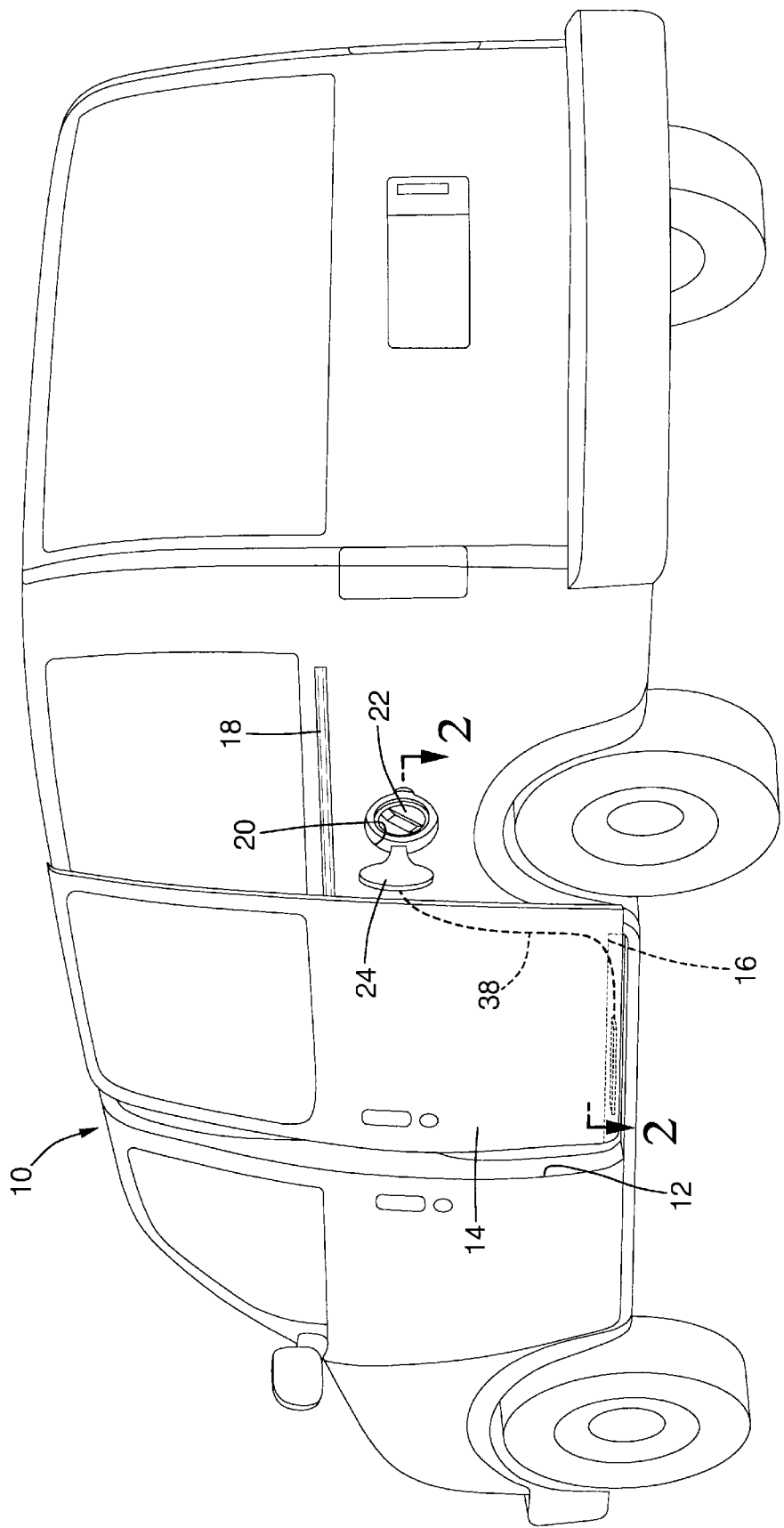
FIG. 1 is a perspective view of a van type vehicle having a sliding door and fuel filler door interlock according to the invention.

Referring to FIG. 1, there is shown a van 10 having a door opening 12 which is selectively opened and closed by a door 14. The door 14 is slidable between its open and closed positions via a floor track 16 mounted in the floor sill of the vehicle body and a second track 18 which is mounted in the outer side wall of the vehicle body.

As seen in FIG. 1, a fuel filler opening 20 is provided in the side wall of the vehicle body to provide access to a fuel filler cap 22. A fuel filler door 24 is hinged to the body for closing the fuel filler opening 20. FIG. 1 shows the fuel filler door 24 pivoted to the open position in which it will interfere with opening movement of the door 14.

Figure 2:
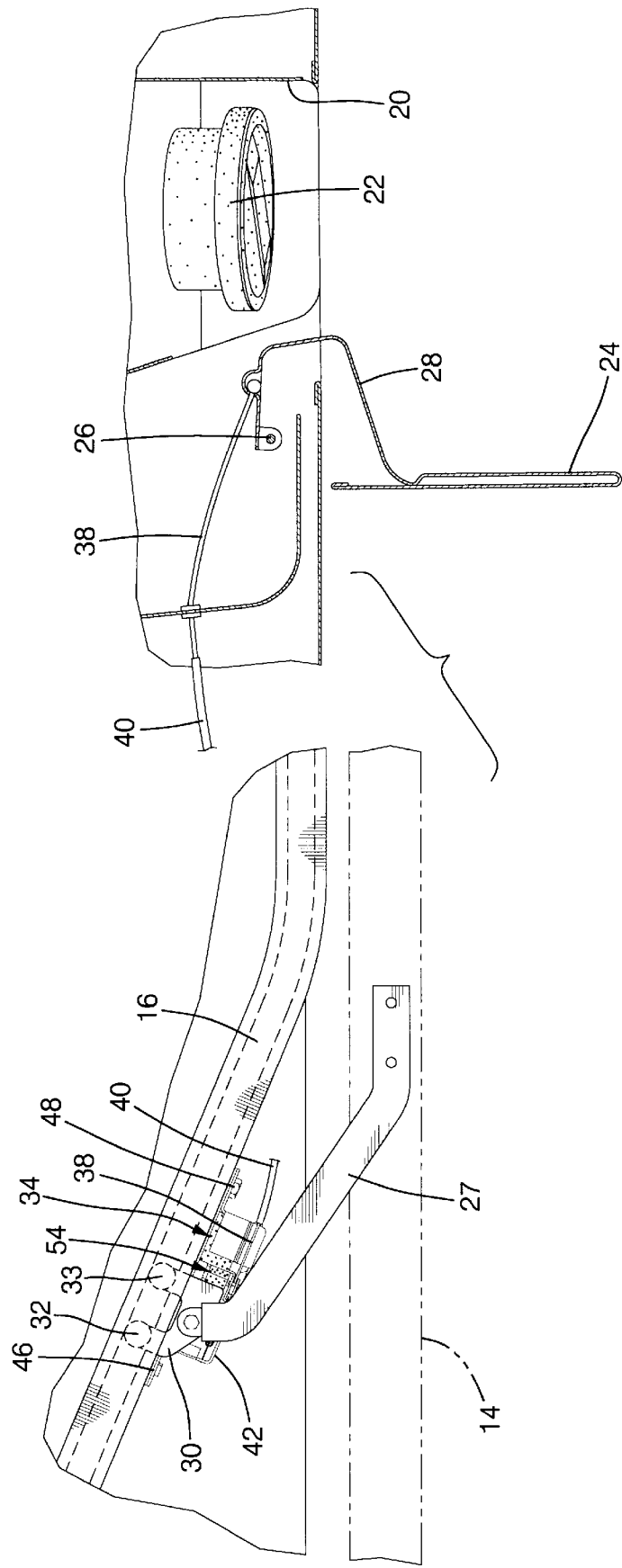
FIG. 2 is a section view taken in the direction of arrows 2—2 of FIG. 1, having parts broken away and in section.

Referring to FIG. 2, it is seen that the door 14, indicated in phantom line, is connected to the track 16 by a gooseneck arm 27 and a carriage 30. The carriage 30 includes a plurality of rollers, not shown, which roll within the track 16 so that the door 14 rolls smoothly fore and aft along the vehicle body. A blocker member assembly, generally indicated at 34, is mounted on the track 16 for blocking rearward movement of the door 14, as will be discussed in greater detail hereinafter in reference to FIGS. 3–7.

As seen in FIG. 2, the fuel filler door 24 is mounted on the vehicle body 10 by a pivot shaft 26 and support gooseneck arm 28. A cable 38 housed in sheath 40 is connected to the arm 28 of the fuel filler door 24 to be tensioned so that the cable 38 is pulled whenever the fuel filler door 24 is pivoted to the open position.

Figure 3:
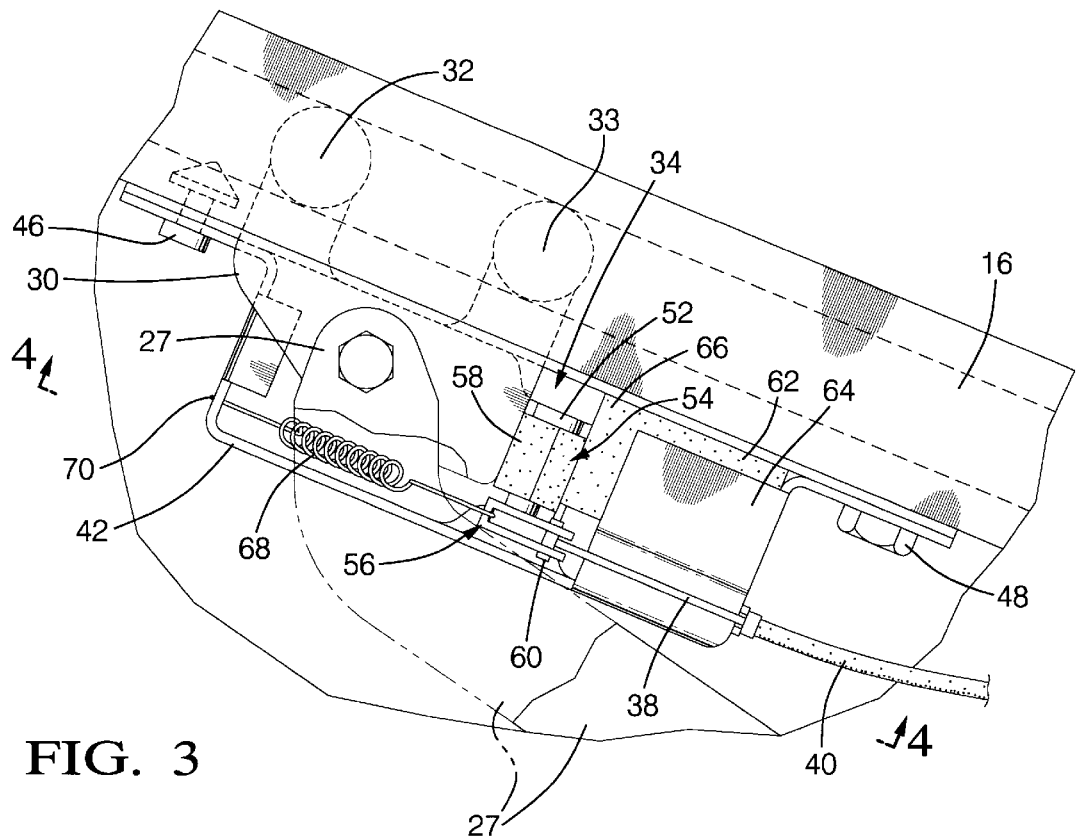
FIG. 3 is a enlarged fragmentary view of FIG. 2 showing the blocker assembly.
Figure 4:
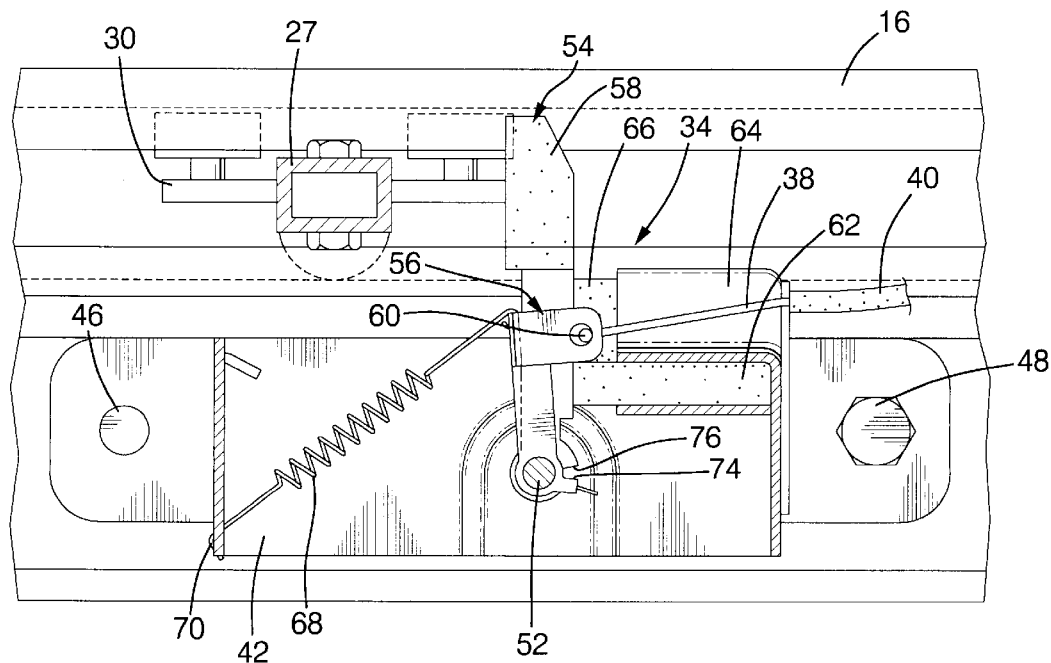
FIG. 4 is a section view in the direction of arrows 4—4 of FIG. 3.

Referring to FIGS. 3 and 4, it is seen that the blocker member assembly 34 includes a housing 42 which is connected to the track 16 by a headed pin 46 and a bolt 48. A pivot shaft 52 is mounted on the housing 42 and pivotally mounts a blocker lever 54 and an actuator lever 56. FIG. 4 shows the blocker lever 54 in an upright extended position in which a plastic tip portion 58 of the blocker lever projects into the path of movement of the arm 27 of the door 14. At its extended position of FIG. 4, the blocker lever 54 rests against a resilient bumper 62 of rubber or other resilient material. The resilient bumper is tightly constrained within a cage portion 64 of the housing 42 and has a contact portion 66 thereof which extends out of the cage portion 64 to be engaged by the blocker lever 54.

The cable 38 is attached to the actuator lever 56 at connector 60. A coil tension return spring 68 has one end attached to the actuator lever 56 and the other end 70 anchored on the housing 42 to urge pivotal movement of the actuator lever in the counterclockwise direction, as viewed in FIG. 4. In FIG. 4, the cable 38 has been tensioned and pulled from the actuator lever 56 from the FIG. 7 position to the position shown. Upon closure of the fuel filler door 24 from its FIG. 2 position, tension is released from the cable 38 allowing the return spring 68 to pivot the actuator lever 56 in the counterclockwise direction to the position of FIG. 7. As best seen in FIG. 4, the actuator lever 56 has an abutment face 74 which is carried into engagement with an abutment face 76 of the blocking lever 54 upon counterclockwise pivoting of the actuator lever so that the actuator lever 56 drives the blocking lever 54 counterclockwise to its withdrawn position shown in FIG. 7.

Figure 6:
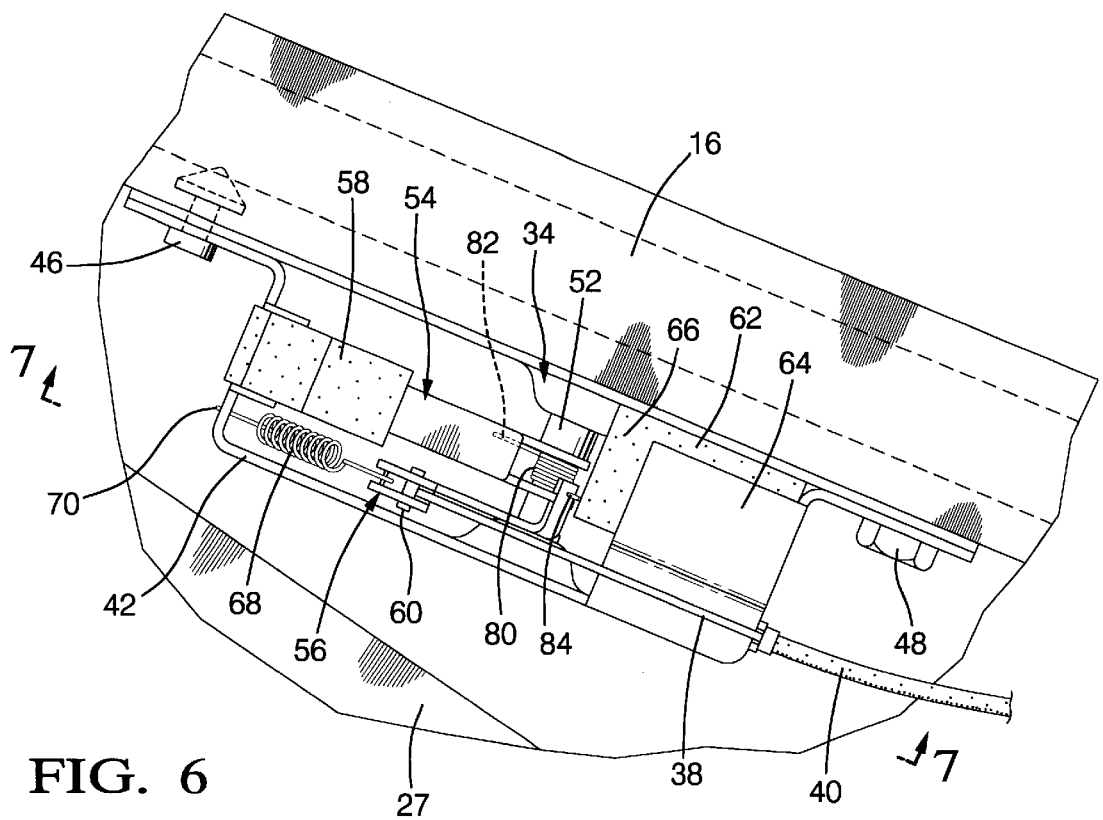
FIG. 6 is an enlarged fragmentary view of FIG. 5 showing the blocker assembly.

As best seen in FIG. 6, a coil torsion spring 80 encircles the pivot pin 52 and includes a spring leg 82 which engages with the blocking lever 54 and a second spring leg 84 which engages with the actuator lever 56. The torsion spring 80 acts in the direction to normally maintain the blocking lever 54 and actuator lever 56 in their relative pivotal positions of FIG. 7 in which the abutment face 74 of the actuator lever 56 engages with the abutment face 76 of the blocking lever 54.

As best seen in FIG. 4, the torsion spring 80 yields somewhat to enable over-travel of the actuator lever 56 in the clockwise direction at the urging of the cable 38 after the blocking lever 54 has come into engagement with the resilient bumper 62. This permissible over-travel forgives misadjustment of the length of the cable 38 and results in a gap between the abutment faces 74 and 76 of the levers.

In addition, the torsion spring 80 will yield in the event that the fuel filler door 24 is somehow opened while the sliding door 14 is already open and the sliding door is then slid forwardly. In that event, the arm 27 can engage with the extended blocking lever 54 and push the blocking lever 54 counterclockwise to permit passage of the arm 27 while the actuator lever 56 remains at rest. Thus, the spring 80 and actuator lever cooperate to provide one-way pivoting of the blocker lever 54 relative the actuator lever 56.

Figure 5:
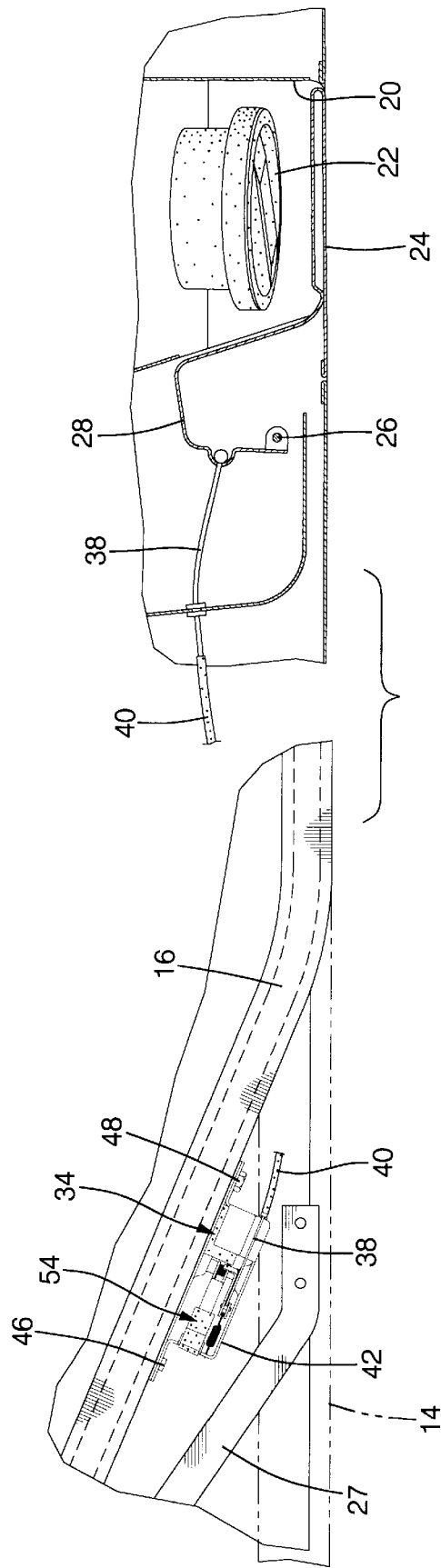
FIG. 5 is a view similar to FIG. 2 but showing the fuel filler door in the closed position.
Figure 7:
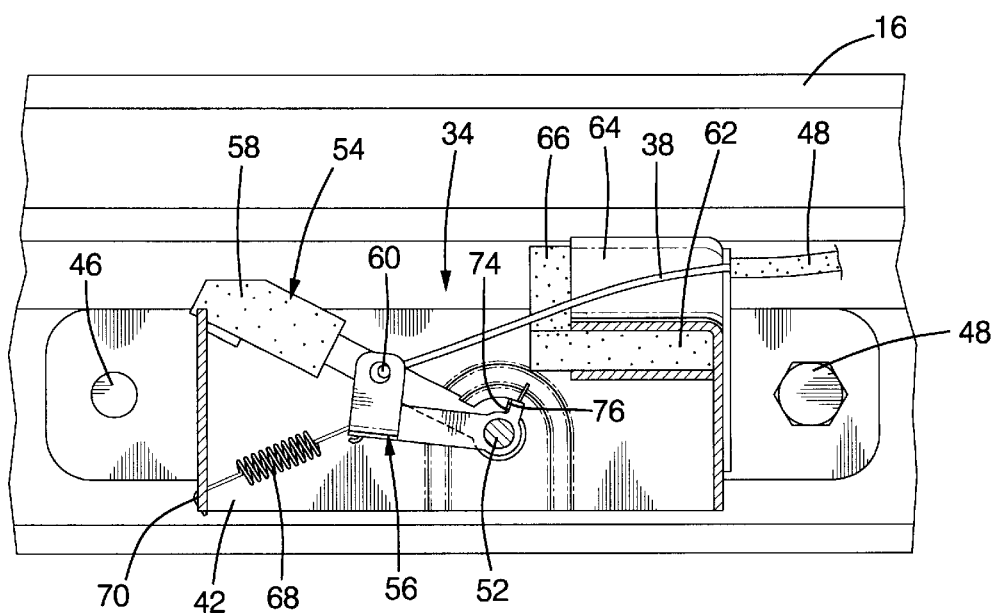
FIG. 7 is a section view taken in the direction of arrows 7—7 of FIG. 6.

Referring to FIG. 5, it will be understood that when the fuel filler door 24 is closed, tension is relieved from the cable 38 allowing the blocking member to be returned to the withdrawn position of FIG. 7.

As seen in FIG. 1, it will be understood that the blocker assembly is located on the body adjacent the track at a location which permits a partially open position of the door 14 and yet stops the door before reaching the extent of travel which would interfere with the fuel filler door. This assumes that the interlock is effective even when the door 14 has been left ajar or slightly open by a passenger that has alighted from the vehicle prior to beginning to fuel the vehicle.

Although the drawing show the block assembly mounted on the floor of track 16, it will be understood that the blocker could be mounted on the body track 18.

Figure 8:
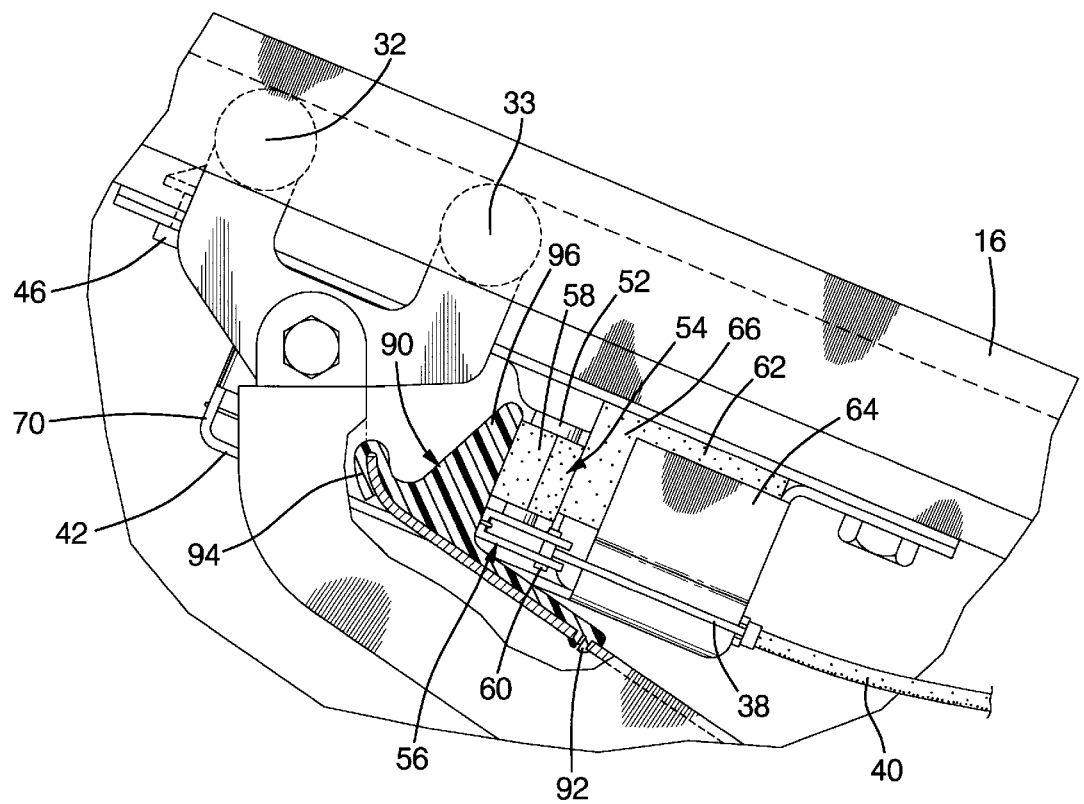
FIG. 8 is a view similar to FIG. 3 but showing a second embodiment of the invention.

FIG. 8 shows a second embodiment of the drawing in which a molded plastic or rubber stop member 90 is mounted on the gooseneck arm 27 by an internal fastener 92 and an internal hook 94 to position a stop projection 96 in position to engage with the blocker lever 54.

Thus, it is seen that the invention provides a new and improved interlock mechanism to assure that the sliding vehicle door cannot be opened when the fuel filler door has been opened to permit fueling of the vehicle.

We claim:

1. In a vehicle having a door sliding between open and closed positions via a door mounted roller mechanism rolling along a track mounted on the body, and a fuel filler door which pivots between open and closed positions and is accessible when the door is closed and inaccessible behind the door when the door is open; the improvement comprising:

a blocker lever pivotally mounted on a housing for movement between an extended position reaching into the path of movement along the track to block opening movement of the door and a retracted position in which the blocker lever is withdrawn from blocking the path of movement of the door along the track;

a cable operated by the pivoting movement of the fuel filler door for actuating the blocker lever to the extended position whenever the fuel filler door is opened so that the door is blocked from movement to interfere with fuel filler door access; and the housing carrying a resilient bumper engaged by the blocker lever when the blocker lever is pivoted to the extended position so that the resilient bumper absorbs energy when attempted opening movement of the door causes the roller mechanism to engage with the blocker lever to stop further opening movement of the door.

2. The improvement of claim 1 further characterized by the housing having a cage to enclose all but a projecting bumper portion of the resilient bumper portion to limit deflection of the resilient bumper by the energy of the siding door.

3. The improvement of claim 1 further characterized by the blocker member having an actuator lever attached to the cable and moving in concert with the fuel filler door, and a spring acting between the actuator lever and the blocker lever by which the pivoting of the actuator lever upon opening movement of the fuel filler door drives the pivoting movement of the blocker lever to the extended position and by which the blocking lever may be forcibly returned from the extended position to the withdrawn position independent of return of the actuator lever to the fuel filler door closed position thereof.

4. In a vehicle having a door sliding between open and closed positions via a door mounted roller mechanism rolling along a track mounted on the body, and a fuel filler door which pivots between open and closed positions and is accessible when the door is closed and inaccessible behind the door when the door is open; the improvement comprising:

a blocker lever pivotally mounted on a housing adjacent the track for movement between an extended position reaching into the path of movement along the track to block opening movement of the door and a retracted position in which the blocker lever is withdrawn from blocking the path of movement of the door along the track;

a cable operated by the pivoting movement of the fuel filler door for actuating the blocker lever to the extended position whenever the fuel filler door is opened so that the door is blocked from movement to interfere with fuel filler door access; and the blocker lever having an actuator lever attached to the cable and moving in concert with the fuel filler door, and a spring acting between the actuator lever and the blocker lever by which the pivoting of the actuator lever upon opening movement of the fuel filler door drives the pivoting movement of the blocker lever to the extended position and by which the blocker lever may be forcibly returned from the extended position to the withdrawn position independent of return of the actuator lever to the fuel filler door closed position thereof.

5. The improvement of claim 4 further characterized by a return spring acting between the housing and the actuator lever to urge the actuator lever to the fuel filler door closed position thereof and drive engaging means engaging between the actuator lever and the blocker lever so that return of the actuator lever by the return spring drives the blocker lever to the withdrawn position.

6. In a vehicle having a door sliding between open and closed positions via a door mounted roller mechanism rolling along a track mounted on the body, and a fuel filler door which pivots between open and closed positions and is accessible when the door is closed and inaccessible behind the door when the door is open; the improvement comprising:

said roller mechanism including rollers rolling within the track, a carriage mounting the rollers and reaching out of the track, and an arm extending between the door and the arm;

a blocker member movably mounted for movement between an extended position reaching into the path of movement of the arm along the outside of the track to engage with the arm outside the track and block opening movement of the door and a retracted position in which the blocker member is withdrawn from blocking the path of movement of the arm along the track; and a cable operated by the pivoting movement of the fuel filler door for actuating the blocker member to the extended position whenever the fuel filler door is opened to block movement of the arm so that the door is blocked from movement to interfere with fuel filler door access.

7. The improvement of claim 6 further characterized by a resilient stop member being mounted on the arm to engage with the blocker member.

* * * * *